United States Patent
Lin

(10) Patent No.: US 6,439,754 B1
(45) Date of Patent: Aug. 27, 2002

(54) GLITTERING PEDAL DEVICE

(76) Inventor: Yung-Fa Lin, 6F, No. 2, Lane 163, Hsin I Rd., Panchiao City, Taipei Hsien (TW)

( * ) Notice: Subject to any disclaimer, the term of this patent is extended or adjusted under 35 U.S.C. 154(b) by 61 days.

(21) Appl. No.: 09/742,542

(22) Filed: Dec. 22, 2000

(51) Int. Cl.[7] ............................. B60Q 1/00; B60Q 1/25

(52) U.S. Cl. .................. 362/488; 362/487; 362/541; 362/86; 362/396; 340/457.3

(58) Field of Search ................... 362/488, 487, 362/84, 86, 396, 541; 340/457.3

(56) References Cited

U.S. PATENT DOCUMENTS 5,863,112 A * 1/1999 Didato ....................... 362/488

* cited by examiner

Primary Examiner—Sandra O'Shea
Assistant Examiner—Ali Alavi
(74) Attorney, Agent, or Firm—Jacobson Holman, PLLC

(57) ABSTRACT

A glittering pedal device equipped on the surface of the gas and brake pedal of an automobile. A plurality of clips on the circumference of the pedal. This device can be fixed on gas and brake pedals through these clips. On top of this device there is a luminescent plate. This luminescent plate is connected to the lamp electrical system. This plate will be on when the automobile is ignited. New drivers can have glittering indications that can make driving more safe.

2 Claims, 6 Drawing Sheets

GLITTERING PEDAL DEVICE

BACKGROUND OF THE INVENTION

I. Field of the Invention

A Glittering Pedal Device is a device that equipped on the surface of the gas and brake pedal of automobiles. The distinctive feature of the device is that there are several a plurality of clip on circumference. This device can be fixed on gas and brake pedal through these clips. On top of this device there is a luminescent plate that is connected to the lamp electrical system. This plate will be turned on when the automobile is ignited. The new drivers can have glittering indications that can make driving more safely.

II. Description of the Prior Art

General speaking, new drivers and new licensee are tended to be more nervous while driving. They can make serious accident if they mistakenly press brake pedal to gas pedal. The Glittering Pedal Device is a device that equipped on surface of the gas and brake pedal of the automobile; On top of this device there is a luminescent plate. In the evening, the new drivers can have glittering indications that can make driving more safely.

Current pedal design is just a metal plate covered with rubber. The style is very simple and dull. Therefore by adding a new plate, not only have a new fashion but also increase the solid pressing feeling.

Traditionally, if the luminescent plate b is to place on gas pedal or brake pedal a firmly, as shown on FIG. 5 and FIG. 6, there must have a plurality of the bolt b1 to go through luminescent plate b. Put luminescent plate b on top of gas pedal or brake pedal a, then pass the bolts b1 on the sides of gas pedal or brake pedal a, let the a plurality of bolt b1 pass through bar c, finally screw nut d on each bolt in order to fix luminescent plate b firmly on gas pedal or brake pedal a.

In reality, the room behind the gas pedal or brake pedal is very tight. If we follow the traditional way to fix the bolts b1 and nut d on bar c is very tedious; it is not so convenient.

Most importantly, the current and traditional way to firmly attach an additional plate on top of these pedals with bolt and nut is not easy; we can imagine to finish such task in the very limited space behind those pedal will be very inconvenient and tedious. There should be a better way and the result must be very safe.

SUMMARY OF THE INVENTION

It is therefore a primary object of the invention to provide a Glittering Pedal Device arranged on top of the gas pedal or brake pedal. On such device equipped with a luminescent plate so as to give new driver clear indication to make driving more safer.

In order to achieve the object mentioned above, the Glittering Pedal Device includes a bottom plate that equipped on gas or brake pedal of an automobile, a luminescent plate on surface of this device, even a plurality of clip on the circumference of the device that can tightly fix this device with pedal conveniently, a voice or signal circuitry to generate voice messages or warning signals to the driver and passengers.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
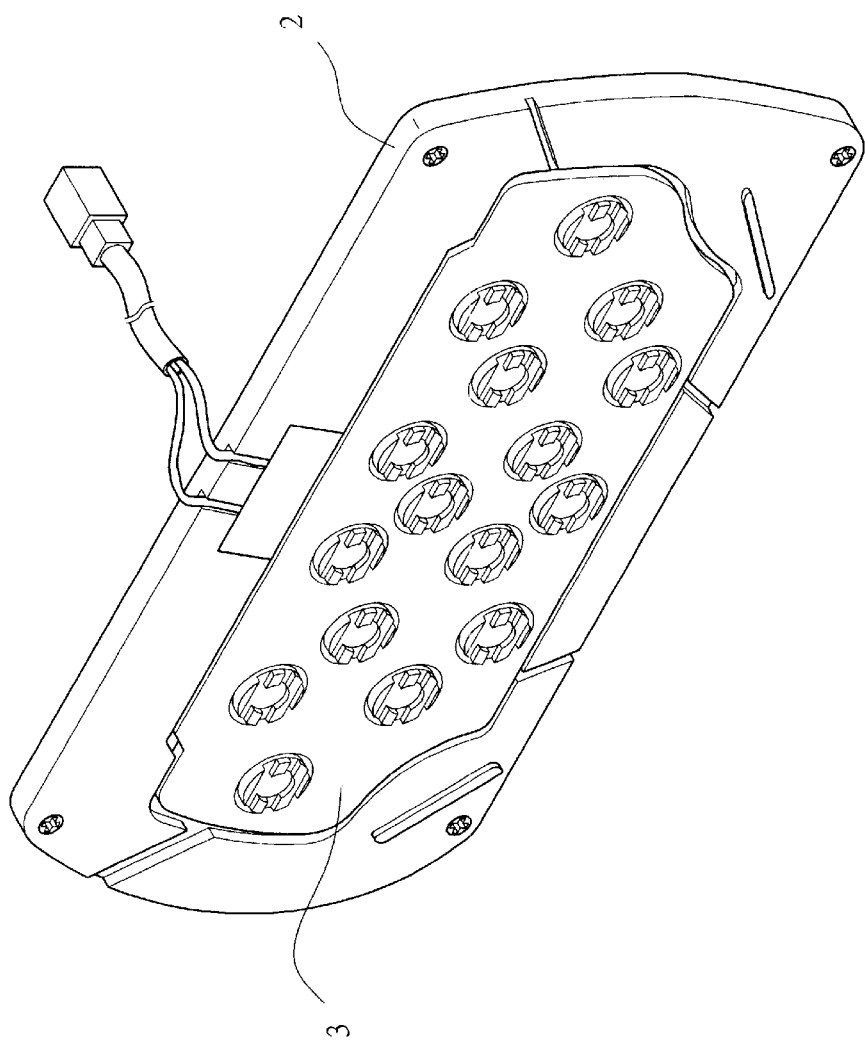
FIG. 1 shows a perspective view of the present invention.
Figure 2:
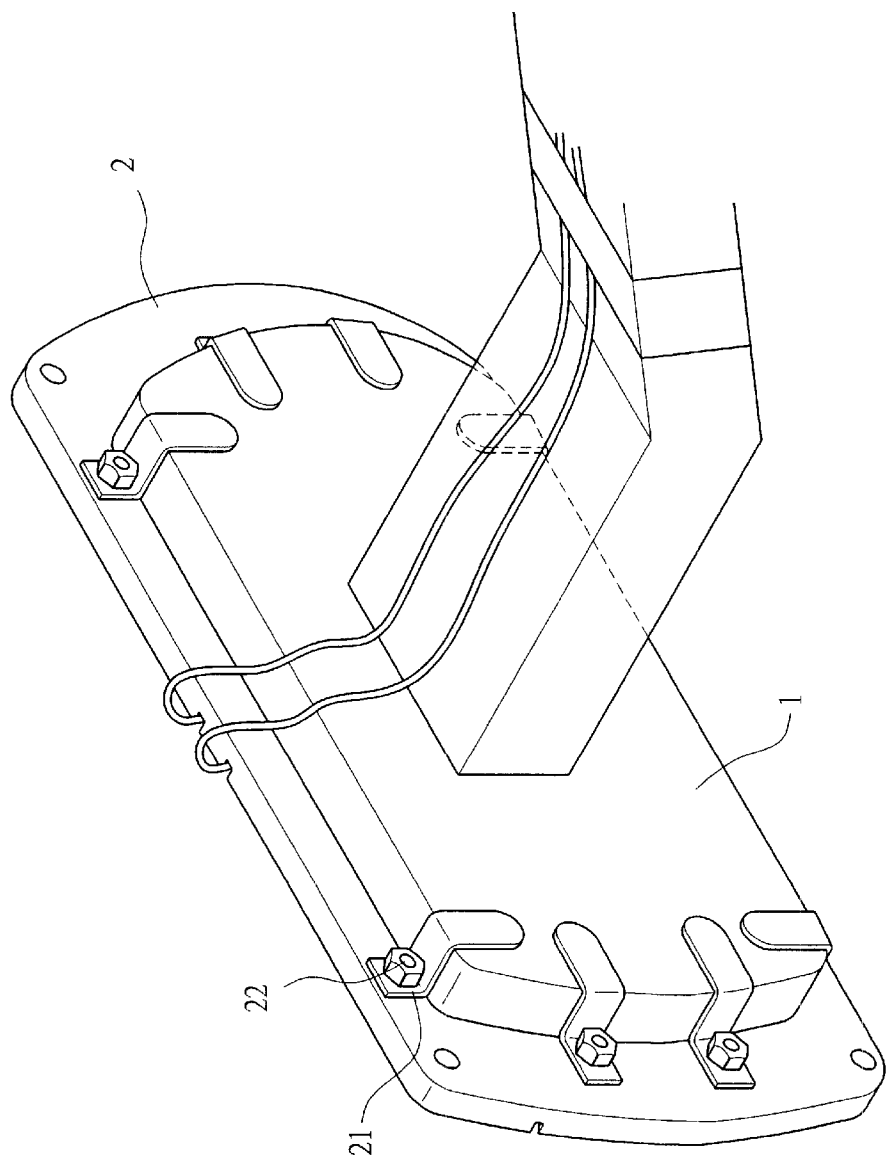
FIG. 2 is a back-view of the present invention.
Figure 3:
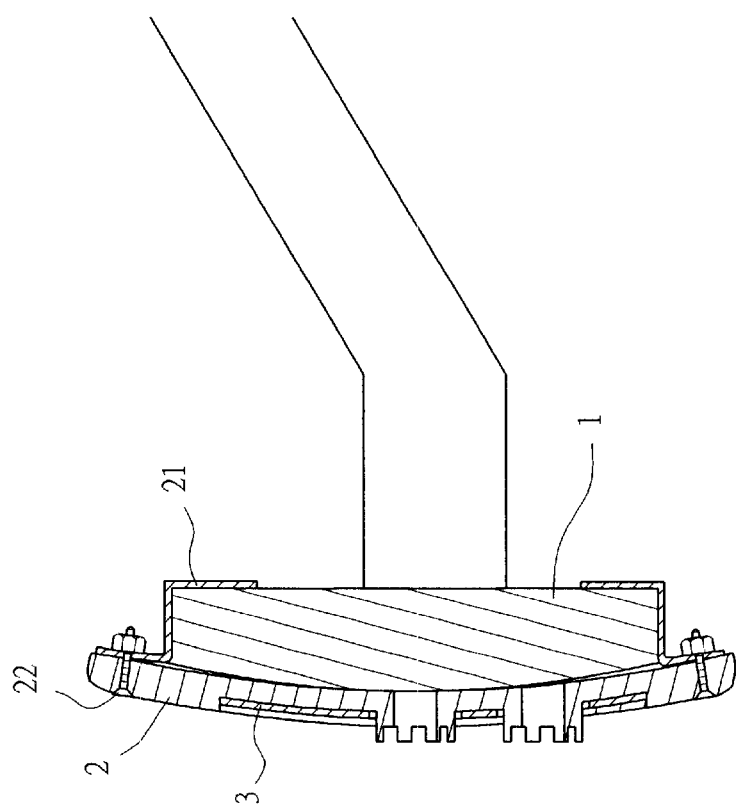
FIG. 3 shows an assembling cross-sectional view of the present invention.

In order to see clearly of this invention, please refer the following illustrations:

First, please refer FIG. 1, FIG. 2 and FIG. 3, this invention is a bottom plate 2 on top of gas pedal or brake pedal 1. The major features are:

There are a plurality of clip 21 on bottom circumference of the bottom plate 2, the bottom plate 2 with gas pedal or brake pedal 1 can be fixed by clip 21. There is a luminescent plate 3 on bottom plate 2. The luminescent plate is electrically connected to the lamp circuitry (not shown on fig.). The luminescent plate 3 is on when the automobile is ignited.

By above description, the luminescent plate 3 on bottom plate 2 is connected to the lamp circuitry. The luminescent plate 3 is on when the automobile is ignited.

The bottom plate 2 on gas pedal or brake pedal 1 can be in two different luminescent lights. The obvious different lights can offer new drivers clear indication for safer driving. Flip outward of the clips 21 on bottom of Device2, fold over bottom plate 2 on gas pedal or brake pedal 1, turn clips 21 to the bottom of the gas pedal or brake pedal. Finally turn bolt 22 on clip 21 tight. This is how to fix firmly bottom plate 2 to gas pedal or brake pedal 1. This is how to avoid the inconvenience and troublesome of the tradition ways.

Figure 4:
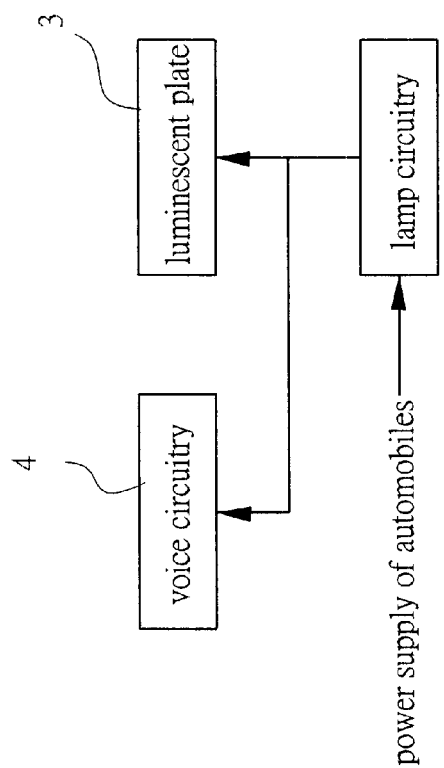
FIG. 4 is another embodiment of the electrical circuitry in accordance with the present invention.
Figure 5:
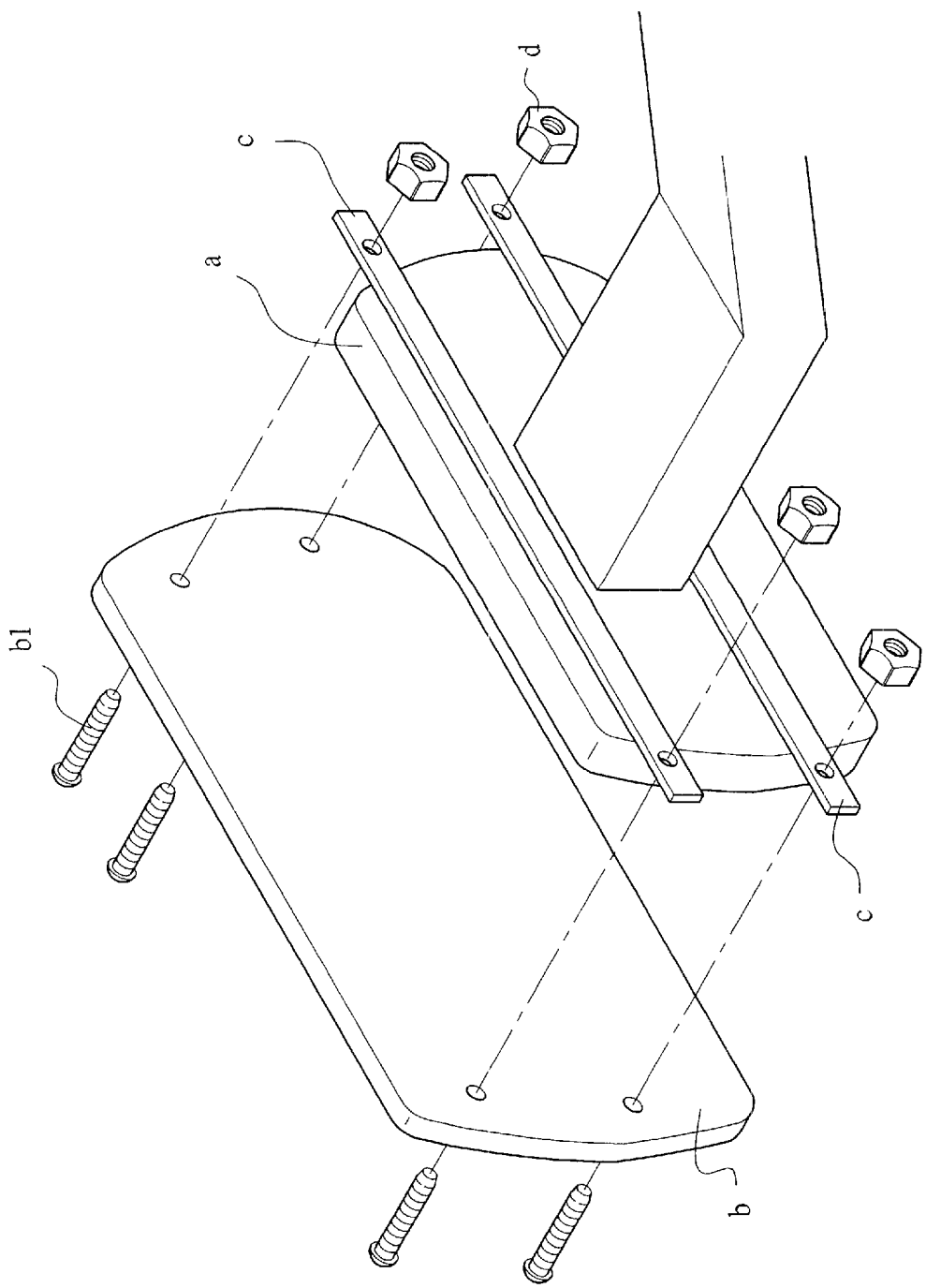
FIG. 5 is a back-view of the prior art.
Figure 6:
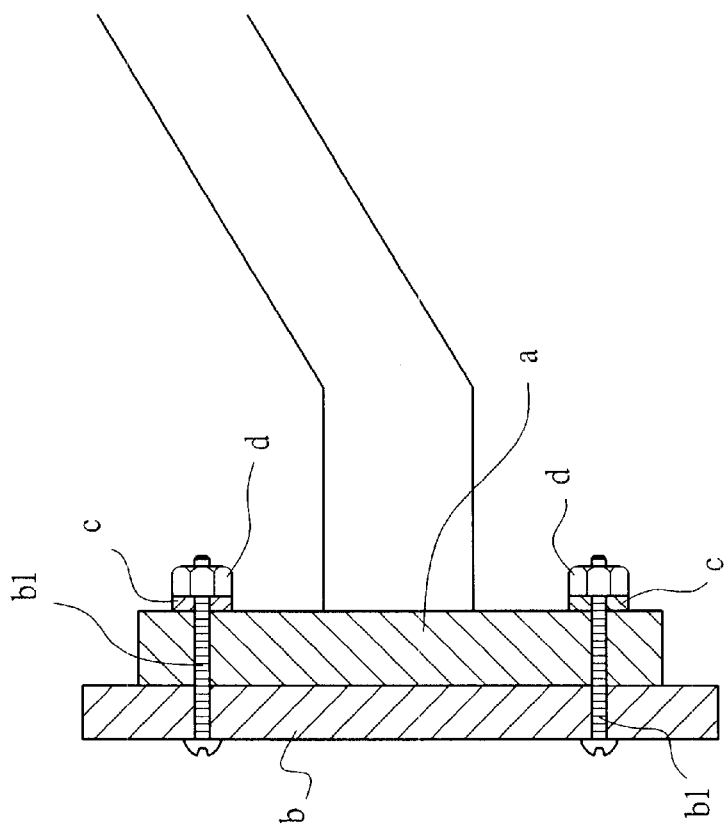
FIG. 6 shows an assembling cross-sectional view of the prior art.

Please refer to FIG. 4, there is a voice circuitry 4 attached to the luminescent plate 3. This voice circuitry 4 sounds voice messages or warning signals when the automobile is ignited. The voice messages or warning signals only sound once when the automobile is ignited. This is one of the ideas of this invention, please refer.

The voice messages can be "Please buckle up your safety belt" or other safety reminding messages; it can also be other warning signals. It is the time to sound the voice messages or warning signals when the automobile starts, which can remind driver or passenger on front seat to buckle up safety belt. This can avoid driver and front seat passenger forget to buckle up safety belt; it can also sound other safety reminding messages so that driver and passengers to do the necessary actions or attention items. In this way to have the better reminding results.

While a preferred embodiment of the invention has been shown and described in detail, it will be readily understood and appreciated that numerous omissions, changes and additions may be made without departing from the spirit and scope of the invention.

What is claimed is:

1. A glittering pedal device comprising:

a bottom plate mounted on a gas or brake pedal of an automobile;

a luminescent plate secured on a surface of said pedal and being electrically connected to a lamp circuitry for power supply; and a plurality of clips arranged on a circumference of said pedal for tightly attaching said luminescent plate on the gas or brake pedal of the automobile.

2. The glittering pedal device as claimed in claim 1, wherein said luminescent plate is connected to a voice or signal circuitry in parallel so as to generate voice messages or warning signals to the driver and passengers when the automobile is ignited.

* * * * *